Aug. 17, 1937. O. B. JONES 2,090,330
DRILL MECHANISM
Filed Sept. 27, 1933  2 Sheets-Sheet 1
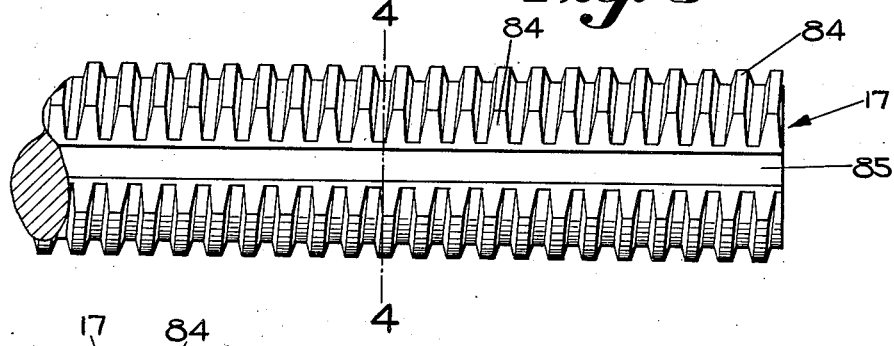
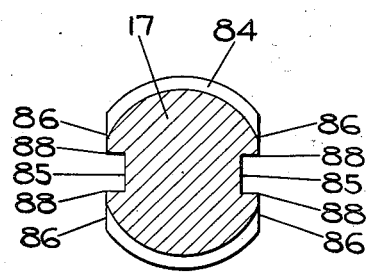
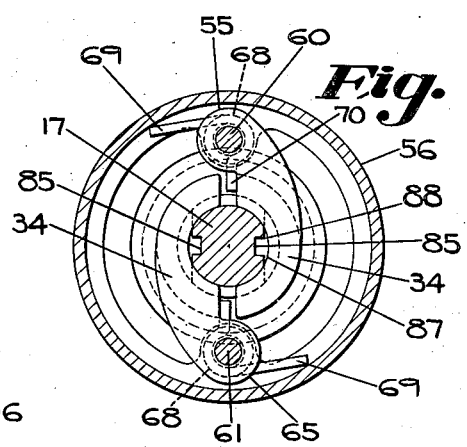
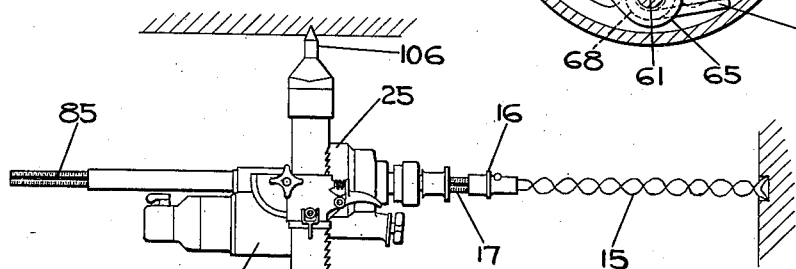
INVENTOR:
Oscar B. Jones,
BY
Chas. M. Nissen,
ATTY.

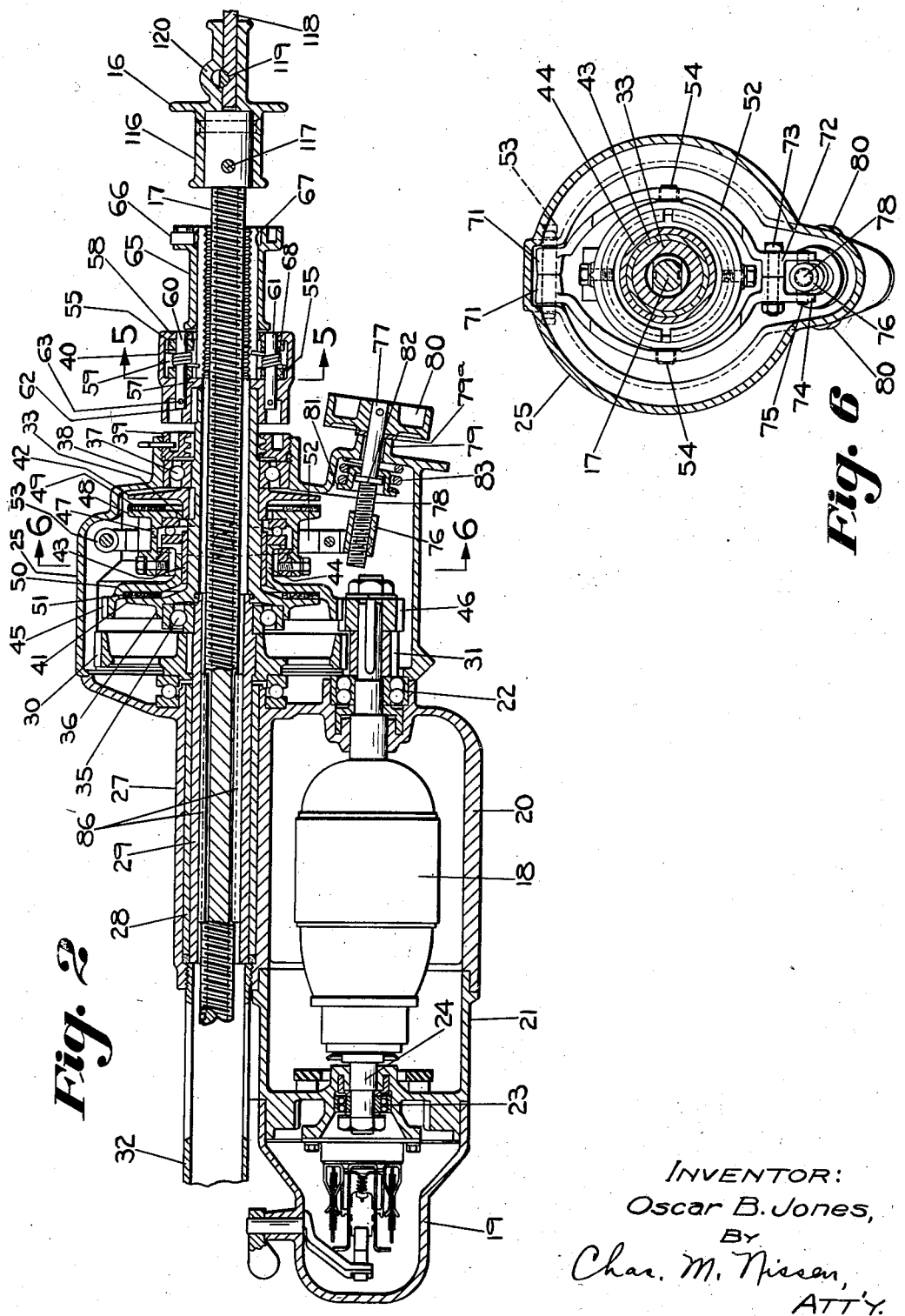

Patented Aug. 17, 1937

2,090,330

UNITED STATES PATENT OFFICE 2,090,330

DRILL MECHANISM

Oscar B. Jones, Columbus, Ohio, assignor to The Jeffrey Manufacturing Company, a corporation of Ohio Application September 27, 1933, Serial No. 691,172

10 Claims. (Cl. 255—46)

In drill mechanism of the type widely employed in mining operations, it is customary to mount a drilling auger on mechanism which will enable the auger to be projected and retracted while the auger is rotated. Such drills are commonly used where it is desired to bore in a vertical face, such as a coal face, to provide shot holes for the reception of the blasting charges.

Such mechanism may include a rotating longitudinally displaceable screw shaft to which the auger is attachable, a feed nut rotatable in the same direction as the screw shaft, but at greater speed, so as to feed the shaft, clutch means to connect the nut with a rotary drive element, and means to arrest rotation of the nut to withdraw the shaft.

The mechanism for rotating the screw shaft may comprise a sleeve provided with splines fitting into key-ways cut longitudinally of the screw shaft. The cutting of the key-way usually produces "burrs" on each thread of the shaft where the milling tool cuts through the threads in making the key-ways. These burrs are then removed by filing each thread by hand until the ends are smoothed off, this procedure being necessary because of the fact that the presence of the burrs would cut the interior of the feed nut and very quickly render the latter inoperative. Furthermore, even after the burrs are removed by the filing operation, after the drill mechanism is assembled and used, the pressure exerted on the edges of the key-ways by the splines of the driving sleeve, in time produces burrs on the threads which then very quickly ruin the feed nut.

This is due to the fact that it has been customary to make the feed nut of comparatively soft material, such as brass, which is easily formed into the finished nut, and to have a close engagement between the screw shaft and the nut around the entire circumference of the shaft.

The present invention, therefore, has for its principal object to provide a screw shaft for a drill which will eliminate the excessive wear on the feed nut, notwithstanding the presence of burrs formed on the edges of the key-ways.

This object of the invention is attained, in general, by making the screw shaft so that it will be flattened along the key-ways so as to bring the portions of the circumference of the screw shaft adjacent the key-ways out of engagement with the interior of the feed nut, so that the burrs, if formed during operation of the drill, will not come into engagement with the nut; and since the flat sides are produced without burrs on the ends of the threads, the hand filing mentioned above is eliminated, and the cost of manufacture is very substantially reduced.

The invention is exemplified in the combination and arrangement of parts shown in the accompanying drawings and described in the following specification, and it is more particularly pointed out in the appended claims.

In the drawings:

Fig. 1 is an elevation showing drilling mechanism embodying the improvements of the present invention mounted in drilling position to operate upon a coal face, for example;

Fig. 2 is a view partly in section and partly in elevation showing the details of the mounting of the improved screw shaft and showing the power transmitting mechanism therefor;

Fig. 3 is a fragmentary elevation of the screw shaft;

Fig. 4 is a section on the line 4—4 of Fig. 3;

Fig. 5 is a section on the line 5—5 of Fig. 2, looking in the direction of the arrows; and Fig. 6 is a sectional view on the line 6—6 of Fig. 2, looking in the direction of the arrows.

Referring more particularly to the drawings, there is provided a post 100 having a roof-engaging member 106 and an adjustable floor-engaging member 111. Suitable supporting means, not indicated on the drawings, being well-known, are adapted to be slidably fixed to the post 100, such supporting means carries the motor casing to which is attached, by suitable bolts, the gear casing 25, which carries all of the gearing and clutch mechanism. The auger or drilling bit 15 is detachably held by a socket 16 fixed to the end of a feed screw 17, which is operatively connected to a motor 18 within a motor casing which comprises a frame 20 having bearings 22 at one end thereof and a commutator housing 21 having bearings 23 at the other end thereof, the housing having fixed thereto a switch housing 19. An armature shaft 24 is mounted in the bearings 22 and 23. The casings 19, 20 and 21, thus formed and joined, make a unit which is air-tight in order to eliminate the danger of gas explosions.

A journal bearing 27 is cast integral with the top wall of the field frame 20 and is provided with an elongated bushing 28 within which is rotatably mounted a driving quill 29 by means of which the feed screw 17 is supported in the bearing 27. The said quill and feed screw are splined together and the latter derives driving power from the former. A gear 30 keyed to the quill 29 meshes with a pinion 31 which is fixed to the armature shaft 24 of the motor 18. Since the feed screw will extend rearwardly of the bearing 27, a pipe guard 32, screw-threaded to the bearing, is provided to prevent injury to the operator.

A sleeve 33 is positioned immediately in advance of the quill 29, partially within the gear casing 25 and partially within a nut casing 40, the latter being disposed in front of the former and fixed to the sleeve. The sleeve 33 surrounds the feed screw 17 and its bore is slightly larger than the diameter of the feed screw; in order that it may be rotatably supported, ball bearings 35 are provided at one end thereof between the outside of the quill 29 and laterally extending annular flange 36 and at the other end thereof by ball bearings 37 fitted into the bore of a bearing 38 of the gear casing 25. A cap or gudgeon 39 closes the end of the bearing 38 and holds the bearing 37 in proper place. The sleeve 33 is the means for driving or holding a nut 34 depending on the direction of feed desired. A friction plate or flange 41 is cast integral with one end of the sleeve 33 and a second friction plate or flange 42 is keyed to the sleeve and longitudinally spaced from the plate 41. Between the said friction plates the sleeve 33 is provided with a bushing 43 upon which is rotatably and slidably mounted the hub 44 of a gear 45 which meshes with a pinion 46 fixed to the outer end of the armature shaft 24.

A slipper ring or collar 47 provided with a flange 48 having a clutch lining 49 fixed to its outer face encircles the elongated hub 44 of the gear 45. The slipper ring is provided with thrust members positioned at either side of a radial flange formed at the free end of hub 44, there being a plain thrust ring at the left of the flange and a ball bearing assembly at the right thereof.

Thus the gear 45 may be shifted to the left through the slipper member with a minimum of friction, elimination of friction in moving the gear to the right being unessential. The gear 45 is provided with a plate center 50 to the outer face of which is fixed a clutch lining 51. A lever in the form of a yoke 52 is pivoted at its upper end to the gear casing 25 on a pin 53, and is connected to the shifter collar 47 by pins or trunnions 54, being adapted to be swung longitudinally of the sleeve 33 in one direction in order to operatively connect the gear 45 to the sleeve through plate 41 and thereby rotate the nut casing 40, or when shifted in the opposite direction to engage the clutch shifter collar 47 with flange 42 and thereby arrest rotation of sleeve 33 and nut casing 40, the collar being held against rotation by the pins 54.

The nut 34 is made in two parts, each part being provided at one end thereof with a pair of ears 55 pierced by suitably aligned apertures. The nut casing 40 comprises a cylindrical outer wall 56 and is provided with inwardly extending flanges 57 and 58 which form a pocket 59. The said flanges are pierced by diametrically disposed aligned apertures adapted to receive pins 60 and 61 which are fixed to the nut casing 40 against longitudinal movement by shoulders 62 and cotter pins 63. The pins 60 and 61 extend through apertures in the ears 55 of each half of the nut. The ears 55 being positioned between flanges 57 and 58, longitudinal movement of the nut relative to the nut casing is prevented, and rotary movement of each half of the nut about the pins 60 and 61 is permitted. Encircling the two halves of the nut in order to hold them in engagement with the feed screw, is a feed nut sleeve 65 which is provided at its outer end with a spring-pressed detent 66 of usual construction, adapted to fit a groove 67 cut in the periphery of the nut. This arrangement prevents longitudinal movement of the sleeve relative to the nut except when it is desired to remove the sleeve in order that the nut may be disengaged from the feed screw. Springs 68 are wound around the pins 60 and 61 and the ends 69 abut against the outer wall of the pocket 59, while the ends 70 extend between the nut halves. The springs are so arranged that they exert an outwardly directed force against each part of the nut and the tendency is to move each half about its pivot to inoperative positions to cause the disengagement from the feed screw.

The yoke 52 comprises two identical castings, each having a boss 71 at their uppermost position for pivotal connection to the pin 53 and to maintain them in properly spaced relationship. Similar bosses 72 are provided at their lowermost portions and by means of a bolt 73 the two members are clamped together. Depending downwardly from the bosses 72 are lugs 74, each provided with an aperture in which is journaled a trunnion pin 75 of a nut 76. A screw-threaded shaft 77 provided with a hand wheel 80 extends through a bearing 79 of the gear casing and into the nut 76. A spring cup 81 abuts a shoulder 82 of the shaft 77 and is held thereagainst by a spring 83 interposed between the said cup and gear case, thereby normally preventing longitudinal non-rotative displacement of the shaft 77 relative to the gear case.

It will be observed that the threads 84 of the feed screw 17 are tapered, being thinner at the top than at the bottom. When the key-ways 85 have been cut through these threads, the metal at the comparatively thin tops of the threads has tended to follow the cutting tool, forming burrs on the threads where the threads are cut through. These burrs have been removed by filing the threads by hand before the drill mechanism is assembled. This has been a tedious and laborious operation, and, because of the labor involved, has very materially increased the cost of manufacture of the feed screws. Furthermore, the pressure of the keys or splines 86', during operation of the drill, on the ends of the threads as the screw 17 moves relatively to the splines, produces burrs which have caused excessive wear on the nut 34, through the cutting action of these burrs as the screw 17 feeds through the nut, the latter being held stationary.

In accordance with the present invention, the hand filing of the threads on the feed screw 17 and wear on the nut 34, as mentioned above, are obviated by milling the feed screw along the keyways 85 so as to form the flattened surfaces 86, the periphery of the screw being cut away sufficiently to form a clearance 87 (Fig. 5) between the edges 88, defining the intersections between the keyways 85 and the threads 84, and the nut 34. This cutting of the feed screw obviously mechanically removes the burrs formed on the ends of the threads, and produces a substantial clearance between the flattened surfaces 86 and the nut 34. Moreover, this flattening of the feed screw along the key-ways eliminates engagement between the threads 84 and splines 86' so that the burrs ordinarily formed on the threads by pressure of the splines 86' are eliminated, and there is avoided, therefore, the excessive wear on the nut 34, as heretofore experienced, which wear was caused by the abrasion of these burrs on the nut as the screw 17 was fed through the nut. In the present construction, since the splines do not engage the threads, obviously such burrs cannot form. If the pressure of the splines 86' should produce burrs on the edge 88 as the screw is fed through the nut, such burrs would be wholly inconsequential because of the clearance between the flattened portions of the shaft and the nut.

It will be understood that the feed screw 17 rotates the auger 15 at the desired cutting speed and it may be fed in either direction, forwardly at a relatively slow feeding speed and reversely at a relatively high withdrawal speed. It will be noted that when the gear 45 is shifted to the left by means of the shifter collar 47, a contact is made between the plate center 50 on the gear and the flange 41; the spring 83 acts as an abutment and should the cutting become too hard for feeding at the usual feed of fifty inches per minute, the spring will be compressed which allows slipping of the clutch. When the shifter collar is moved in the opposite direction the clutch 49 will be engaged to prevent rotation of the nut, and since the feed screw is rotated clockwise and the threads are left-handed, the feed screw will be moved in a reverse direction. When this operation is performed, the hand wheel 80 abuts the boss 79a.

It will be understood that the feed screw of the present invention is adapted for use in any type of drill and is, therefore, of general applicability and utility. Said feed screw is, however, particularly useful with a drill of the type disclosed in the patent to R. K. Jeffrey, No. 2,030,636 for a Drill mechanism, granted February 11, 1936, which patent shows and claims the general construction of the drill herein disclosed.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. Feed mechanism for drilling machines, comprising a supporting frame, a feed nut mounted thereon, a quill mounted in the said frame for rotary movement relatively thereto but held against longitudinal movement, and an elongated rotatably mounted feed screw threaded through the said nut and provided with a flat face and a longitudinal groove having edges spaced from the threads of the said feed screw and formed by said flat face, the said quill having a spline parallel to the axis of the said feed screw and extending into the said groove in driving relation to the said feed screw while being spaced from said threads.

2. Drill mechanism comprising the combination with a feed screw, of driving means for the feed screw, and a nut threaded on the screw for selectively advancing and retracting the feed screw, the said feed screw having flat portions adjacent the driving means defining a clearance between the feed screw and the nut to prevent engagement of burrs formed on the feed screw during operation thereof with the threads of the nut, thereby preventing mutilation of the threads of the nut during operation of the feed screw.

3. Drill mechanism comprising the combination with a feed screw, of a nut surrounding the feed screw for selectively advancing and retracting the said feed screw, the feed screw being provided with keyways having burr forming edges, and mechanism for driving the feed screw, including parts slidably engaging the said keyways, the screw having its surface adjacent the keyways flattened to provide sufficient clearance between the keyway edges and nut to prevent engagement of burrs, formed on the keyway edges during operation of the screw, with the nut, thereby reducing wear on the said nut.

4. Drill mechanism comprising the combination with a feed screw, of a nut surrounding the feed screw for selectively advancing and retracting the said feed screw, the feed screw being provided with diametrically opposed keyways extending the length of the shaft, and mechanism for driving the feed screw, the said mechanism including parts engaging the said keyways, the feed screw being flattened along its length adjacent the keyways to provide clearance between the feed screw and nut, whereby any burrs formed on the feed screw along the keyways during operation of the shaft will clear the interior of the nut, thereby reducing wear on the said nut.

5. Drill mechanism comprising the combination with a feed shaft, of a nut threaded on the feed shaft for selectively advancing and retracting the said feed shaft, the feed shaft being provided with a keyway, and mechanism engaging the keyway for driving the feed shaft, the feed shaft being formed along its length adjacent the keyway to provide sufficient clearance between the shaft and nut to prevent engagement of any burrs formed on the keyway during operation of the shaft with the interior of the nut, thereby preventing mutilation of the threads of the nut during operation of the shaft.

6. In a drill, the combination with a threaded feed shaft having a keyway and a flat side extending on each side of said keyway, of means for rotating said shaft including a key movable longitudinally of said shaft in said keyway, a feed nut threaded on said shaft, and means operable to rotate said nut with respect to said shaft.

7. In a coal drill, the combination with a feed shaft having interrupted threads thereon formed by parallel flat surfaces on opposite sides thereof and having longitudinally extending keyways in the centers of said flat surfaces, of means for rotating said shaft including keys extending into said keyways, a feed nut threaded on said shaft, and means to rotate said feed nut with respect to said shaft.

8. In a mechanism of the class described, the combination with a feed screw having threads, of a feed nut threaded on said feed screw to advance and retract said feed screw, said feed screw having a longitudinally extending drive portion which interrupts the continuity of said threads and forms edges on said threads, and means for rotating said feed screw including a member having a bearing contact therewith with respect to which said feed screw slides when advanced or retracted, the feed screw and rotating means being so formed that the bearing contact between said rotating means and said feed screw is spaced from the teeth of said feed screw and whereby any burrs formed on the feed screw along said bearing area by said rotating means are spaced from the feed nut.

9. In a mechanism of the class described, the combination with a feed screw having threads interrupted by an elongated longitudinally extending flattened portion, of a feed nut threaded on said feed screw to advance and retract said feed screw, a keyway formed along the flattened portion of said feed screw and forming edges with said flattened portion at least one of which is spaced from the feed nut engaging portions of the threads of said feed screw, means for rotating said feed screw comprising a key extending into said keyway and slidable with respect thereto, which in operation tends to form a burr along said one edge, whereby any burr formed along said edge is spaced from the feed nut and the feed nut engaging portions of the feed screw threads, thereby doing no harm to the feed nut.

10. In a mechanism of the class described, the combination with a feed screw having threads interrupted by a longitudinally extending flattened portion and a keyway extending longitudinally along said flattened portion, of a feed nut threaded on said feed screw, means for rotating said feed screw including a key slidable along said keyway, said feed screw and key having a bearing contact along a surface spaced from the portions of the threads of said feed screw which contact said feed nut and from the threads of said feed nut, whereby should a burr be formed by said sliding bearing contact it will not damage said feed nut.

OSCAR B. JONES.